United States Patent
Park et al.

(10) Patent No.: US 10,827,432 B2
(45) Date of Patent: *Nov. 3, 2020

(54) WIRELESS COMMUNICATION SYSTEM AND METHOD TO IMPROVE COEXISTENCE FOR WAKE-UP PACKETS

(71) Applicant: Intel Corporation, Santa Clara, CA (US)

(72) Inventors: Minyoung Park, Portland, OR (US); Shahrnaz Azizi, Cupertino, CA (US); Po-Kai Huang, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/428,690

(22) Filed: May 31, 2019

(65) Prior Publication Data

US 2019/0387472 A1    Dec. 19, 2019

Related U.S. Application Data

(63) Continuation of application No. 15/472,353, filed on Mar. 29, 2017, now Pat. No. 10,321,402.

(51) Int. Cl.
*H04W 52/02* (2009.01)
*H04L 27/04* (2006.01)
(Continued)

(52) U.S. Cl.
CPC ......... *H04W 52/0235* (2013.01); *H04L 27/04* (2013.01); *H04L 27/183* (2013.01);
(Continued)

(58) Field of Classification Search
CPC . H04W 84/12; H04W 52/0235; H04W 16/14; H04W 40/005; H04W 4/38;
(Continued)

(56) References Cited

U.S. PATENT DOCUMENTS

2017/0111858 A1*  4/2017  Azizi ................. H04L 5/0053
2017/0303208 A1* 10/2017  Suh .................. H04L 27/2601
(Continued)

FOREIGN PATENT DOCUMENTS

WO    2018121863 A1    7/2018

OTHER PUBLICATIONS

German Patent Office; Office Action issued in German Patent Application No. DE 102018002571.4, dated Jun. 15, 2020; 10 pages without English translation.

*Primary Examiner* — Awet Haile
(74) *Attorney, Agent, or Firm* — Alliance IP, LLC

(57) ABSTRACT

A wireless communication system and method. The system includes processing circuitry, and a transceiver coupled to the processing circuitry. The processing circuitry includes logic to generate a wake-up packet addressed to another wireless communication system and including a legacy preamble portion and a wake-up portion, the legacy preamble portion modulated according to a first modulation rate. The wake-up portion is modulated according to a second modulation rate lower than the first modulation rate and includes information to wake-up the other wireless communication system. The transceiver system is to transmit the legacy preamble using a first transmit power level, and to transmit the wake-up portion using a second transmit power level higher than the first transmit power level by a predetermined amount such that an average received power of the wake-up portion is equal to an average received power of the legacy portion at the third-party station.

20 Claims, 6 Drawing Sheets

(51) Int. Cl.
  *H04L 27/20*   (2006.01)
  *H04W 84/12*   (2009.01)
  *H04L 27/18*   (2006.01)

(52) U.S. Cl.
  CPC ............. *H04L 27/20* (2013.01); *H04W 84/12* (2013.01); *Y02D 70/00* (2018.01); *Y02D 70/10* (2018.01); *Y02D 70/1226* (2018.01); *Y02D 70/1262* (2018.01); *Y02D 70/1264* (2018.01); *Y02D 70/14* (2018.01); *Y02D 70/142* (2018.01); *Y02D 70/144* (2018.01); *Y02D 70/146* (2018.01); *Y02D 70/26* (2018.01)

(58) Field of Classification Search
  CPC ... H04W 4/80; H04W 52/02; H04W 52/0212; H04W 52/0219; H04W 52/028; H04W 52/248; H04W 72/0453; H04W 84/02; H04L 5/0007; H04L 27/0008; H04L 27/02; H04L 27/10; H04L 27/18
  See application file for complete search history.

(56) References Cited

U.S. PATENT DOCUMENTS

2018/0020501 A1* 1/2018 Aboul-Magd ........ H04W 76/28
2018/0077641 A1* 3/2018 Yang ..................... H04L 69/22

* cited by examiner

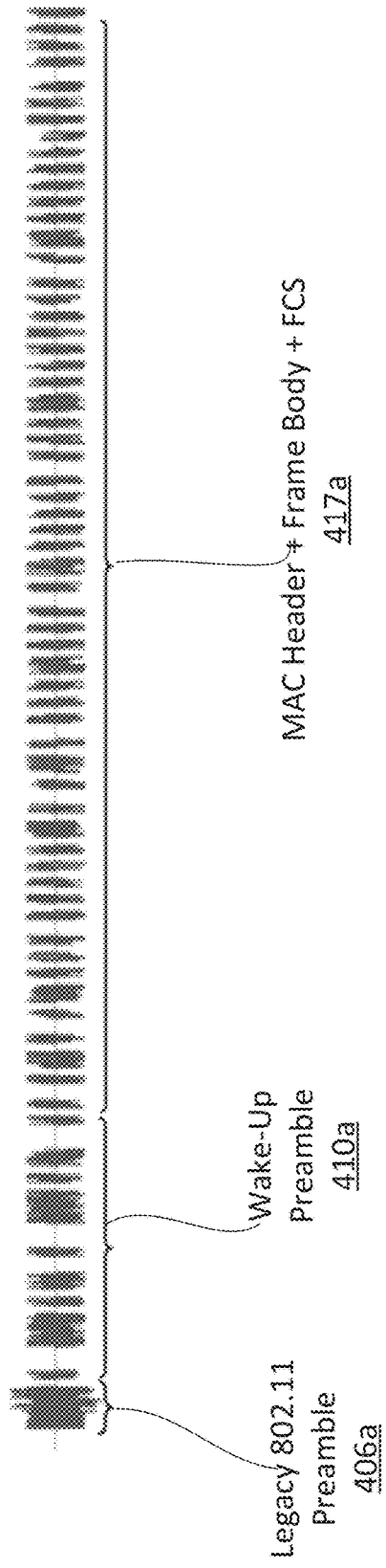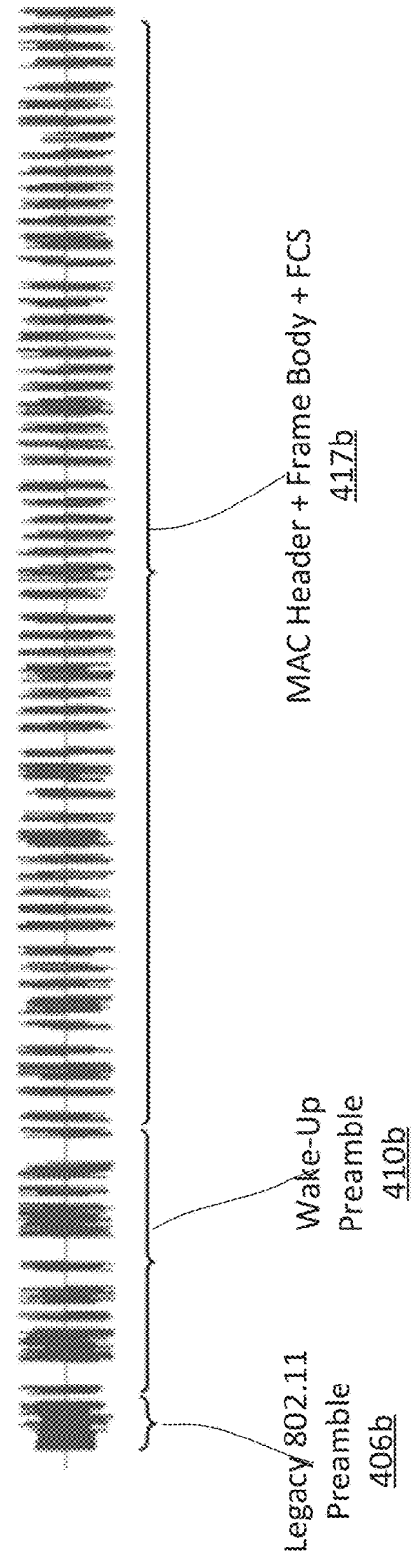
Fig. 4a
Fig. 4b

600 generating a wake-up packet addressed to another wireless communication system, the wake-up packet including a legacy preamble portion and a wake-up portion, wherein the legacy preamble portion is modulated according to a first modulation rate and includes information to allow a third-party station to refrain from transmitting during a length of the wake-up packet, and wherein the wake-up portion is modulated according to a second modulation rate lower than the first modulation rate and includes information to wake-up a radio system of the other wireless communication system
602 causing transmission of the legacy preamble using a first transmit power level
604 causing transmission of the wake-up portion using a second transmit power level higher than the first transmit power level by a predetermined amount such that an average received power of the wake-up portion is greater than or equal to an average received power of the legacy portion at the third-party station
606

Fig. 6

WIRELESS COMMUNICATION SYSTEM AND METHOD TO IMPROVE COEXISTENCE FOR WAKE-UP PACKETS

CROSS REFERENCE TO RELATED APPLICATIONS

This application is a continuation of U.S. application Ser. No. 15/472,353, filed on Mar. 29, 2017, and entitled WIRELESS COMMUNICATION SYSTEM AND METHOD TO IMPROVE COEXISTENCE FOR WAKE-UP PACKETS, the disclosure of which is considered part of and is hereby incorporated by reference in its entirety in the disclosure of this application.

TECHNICAL FIELD

Embodiments relate to wireless communication in a low power setting. Some demonstrative embodiments relate to a construction of low-power wake-up (LP-WU) packet for waking up a wireless local-area network (WLAN) device with low-power wake-up receiver (LP-WUR) within an IEEE 802.11 network.

BACKGROUND

Low power wireless devices are enabling many wireless devices to be deployed in wireless local-area network (WLAN). However, the low power wireless devices are bandwidth constrained and power constrained, and yet may need to operate with both newer protocols and with legacy station protocols.

BRIEF DESCRIPTION OF THE DRAWINGS

The present disclosure is illustrated by way of example and not limitation in the figures of the accompanying drawings, in which like references indicate similar elements and in which:

FIG. 4a shows an example of an LP-WU packet waveform in the time domain without power enhancement;

FIG. 4b shows a LP-WU packet waveform in the time domain with power enhancement according to some demonstrative embodiments;

FIG. 6 illustrates a flow-chart of a method according to some demonstrative embodiments.

DETAILED DESCRIPTION

The following description and the drawings sufficiently illustrate specific embodiments to enable those skilled in the art to practice them. Other embodiments may incorporate structural, logical, electrical, process, and other changes. Portions and features of some demonstrative embodiments may be included in, or substituted for, those of other embodiments. Embodiments set forth in the claims encompass all available equivalents of those claims.

To reduce power consumption in a basic service set (BSS), the idea of using a low-power wake-up receiver (LP-WUR) in Wi-Fi devices has been developed, and has been introduced into the Institute of Electrical and Electronics Engineers (IEEE) 802.11 community in late 2015. Since that time, LP-WUR has received much attention. Recently, a new Study Group (SG) named Wake-Up Receiver (WUR) SG was formed under IEEE 802.11 to study and begin standardization of the new wireless communication protocol as a new amendment to the 802.11 standard specification. The WUR SG has been approved and is slated to be replaced by the 802.11TGba Task Group. The WUR provides an ultra-low power solution (for example about 100 μW in an active state) for an always on Wi-Fi or Bluetooth (BT) connectivity of wearable, Internet-of-Things (IoT) or other emerging devices that may be densely deployed. Although 100 μW is mentioned here, it is merely an example of the power used in a listen state. Embodiments encompass LP-WURs that use lower or high power, such as, for example, a few hundred μW. Hereinafter, LP-WUR may be used to refer to the 802.11ba/LP-WUR wireless communication protocol, or to LP-WU functionality (that is, functionality in compliance with the LP-WUR wireless communication protocol), and the meaning of the acronym will be clear from the context within which it is used.

Figure 1:
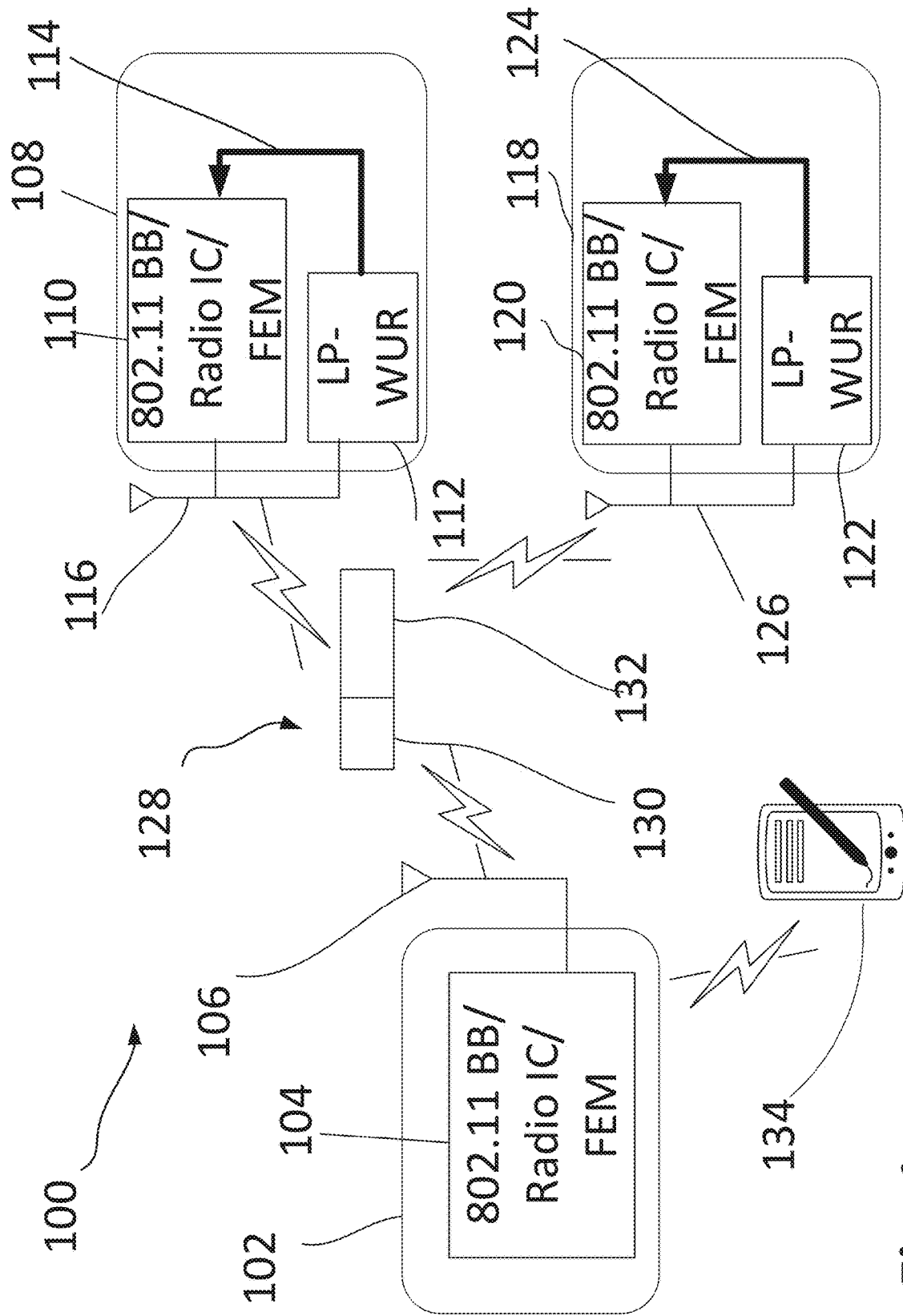
FIG. 1 illustrates a basic service set (BSS) including an access point (AP), two stations (STAs) each including Low-Power Wake-Up Receivers, and a legacy STA.

To better understand the concept behind LP-WUR, we refer to FIG. 1, which depicts a Wireless Local Area Network (WLAN) BSS 100 including an AP 102, two LP-WUR compliant STAs 108 and 118, and a legacy STA 134. By "legacy," what is meant herein is compliance with a standard that is not LP-WUR. The AP and STAs may, regardless of compliance with LP-WUR, use one of the IEEE 802.11 wireless communication protocols to transmit and receive. The AP and STAs may use other communications protocols as well as any of the IEEE 802.11 protocols. The IEEE 802.11 protocols may include Wi-Fi protocols, for example, the IEEE 802.11ax protocol, the 802.11ac protocol, the 802.11-2012 protocol, the 802.11n protocol, the 802.11a protocol, the 802.11g protocol, and/or any other 802.11 protocol. The IEEE 802.11 protocols may include using orthogonal frequency division multiple-access (OFDMA), time division multiple access (TDMA), and/or code division multiple access (CDMA). The IEEE 802.11 protocol may include space-division multiple access (SDMA) and/or multiple-user multiple-input multiple-output (MU-MIMO).

The AP and each of STA 108 and 118 is shown to that effect as including an 802.11 radio system such as 802.11 radio system 104 of AP 102, 802.11 radio system 110 of STA 108 and 802.11 radio system 120 of STA 118 (the radio system for legacy STA 134 has not been shown, although a person skilled in the art would readily understand that it would be present). Each radio system may include one or more baseband processors, one or more radio integrated circuits, and one or more radio front end modules as would be recognized by one skilled in the art. In addition, each radio system may be coupled to one or more antennas. For example, radio system 104 may be coupled to antenna 106 to allow transmission and reception of radio signals by AP 102. Radio system 110 may be coupled to antenna 116 to allow transmission and reception of radio signals by STA 108 and radio system 110 may be coupled to antenna 116 to allow transmission and reception of radio signals by STA 108. Although each radio system is shown in FIG. 1 as being coupled to one antenna, it is to be understood that embodiments apply to APs or STAs that include one or more antennas coupled to the same radio system, and one or more antennas coupled to various radio systems that are compliant with protocols other than 802.11. Embodiments include within their scope the provision of various components of a radio system on a single physical integrated circuit (or card), or on multiple integrated circuits as would be recognizable by one skilled in the art.

Referring still to FIG. 1, STAs 108 and 118 each include a LP-WUR that is coupled to their 802.11 radio systems 110. It is to be noted that, although FIG. 1 suggests the LP-WUR as potentially being physically distinct from the 802.11 radio system in each STA, embodiments include within their scope various levels of integration between the LP-WUR and the 802.11 radio system. For example, the LP-WUR could include at least one of a LP-WU baseband processor, a LP-WU radio integrated circuit (IC), and a LP-WU front-end module (FEM) that is integrated with a respective one of the non-LP-WU 802.11 baseband processor, radio IC and FEM.

With respect to AP 102, FIG. 1 does not show a LP-WUR that is coupled to the 802.11 radio system. This is not to suggest that AP may not include a LP-WUR, but merely that, with respect to the operations to be described further below with respect to BSS 100 of FIG. 1, the presence of a LP-WUR as part of AP 102 would not be relevant, because no LP-WU packets would be sent to AP 102 during those operations to be described, but would rather be sent by AP 102 to an LP-WUR of another STA, for example, either STA 108 or STA 118. The above having been said, the 802.11 radio system of AP 102, in the shown embodiment, would have LP-WU functionality in that it would be configured to send LP-WU packets to other LP-WUR compliant STAs. Further details regarding an embodiment for an AP or a STA that can provide LP-WU functionality will be provided with respect to FIG. 3 below.

Referring still to FIG. 1, AP 102 is shown as having sent a LP-WU packet 128 addressed to STA 108. The LP-WU packet 128 includes a preamble portion 130, and a wake-up portion 132. Details regarding the packet structure for LP-WU packet 128 will be provided with respect to FIG. 2 below. A purpose of LP-WU packet 128 is to alert a LP-WUR to wake up its main radio system, such as, for example, an 802.11ax, 802.11ac, 802.11-2012, 802.11n or other radio system that operates at a higher power level and processes higher modulation rate symbols than that applicable to the LP-WUR and that can receive and process user data packets. For example, packet 128 as sent by AP 102 may be addressed to LP-WUR 112 of STA 108 or to LP-WUR 122 of STA 118 (or potentially both) to signal to either or both LP-WUR to wake up its/their associated main 802.11 radio system so that the main radio system can subsequently receive user data packets sent by AP 102, and specifically sent by radio system 104 of AP 102. The main radio system is in this way to remain in the off state to conserve power, while the LP-WUR is to remain in an on state to receive LP-WU packets. A signaling between the LP-WUR and its associated main radio system is depicted in FIG. 1 by way of a signal connection 114 and 124 corresponding respectively to a connection between LP-WUR 112 and radio system 110 on the one hand, and between LP-WUR 122 and radio system 120 on the other hand. The connection may for example be wired or wireless, and is to allow a wake-up signal to be sent from the LP-WUR to its main radio system to wake up the main radio system for reception of data packets.

It is to be appreciated that LP-WUR may be configured as a simple receiver without including a transmitter, and further without the capability of processing user data packets per se. It may remain on/active as long as the main radio system is off, and may be inactive when the main radio system is on/active. LP-WU packets may be generated by an AP using a simple modulation scheme such as an On-Off-Keying (OOK) modulation scheme, and a narrow bandwidth such as, for example, a bandwidth of less than about 5 MHz, for example, about 4.06 MHz or about 2.031 MHz. A target transmission range of a LP-WU packet may be similar to a transmission range for today's 802.11 compliant transmitters, that is, up to a few hundred meters, such as, for example, up to about 250 m to 300 m, or more. A concept for LP-WUR has been contemplated which is based on the 802.11a/g/n/ac specification which uses a 4 µsec (3.2 µsec+ Cyclic Prefix (CP)) Orthogonal Frequency Division Multiplexing (OFDM) duration. In a time-domain, the above would provide a symbol duration of 3.2 µsec (taking the Inverse Fast Fourier Transform (IFFT) as 64/20 MHze6). Taking into consideration the legacy preambles using a fixed 0.8 µsec guard band or cyclic prefix extension, the total symbol duration becomes 4 µsec. A LP-WU signal, such as a wake-up portion of a LP-WU packet, may have a pulse bandwidth of 2.03 MHz or 4.06 MHz; a frequency spacing between tones in the wake-up portion of 78.125 kHz or 312.5 kHz; and the wake-up portion may include 26 tones or 13 tones per symbol, with any combination of the above pulse bandwidths, frequency spacing between tones and number of tones per symbol being possible.

LP-WUR further contemplates using 13 subcarriers (4.06 MHz) per symbol. For example, a LP-WU signal waveform may have 1 bit per symbol period, with each symbol period being about 4 µsec, achieving a rate of about 250 kbps.

Figure 2:
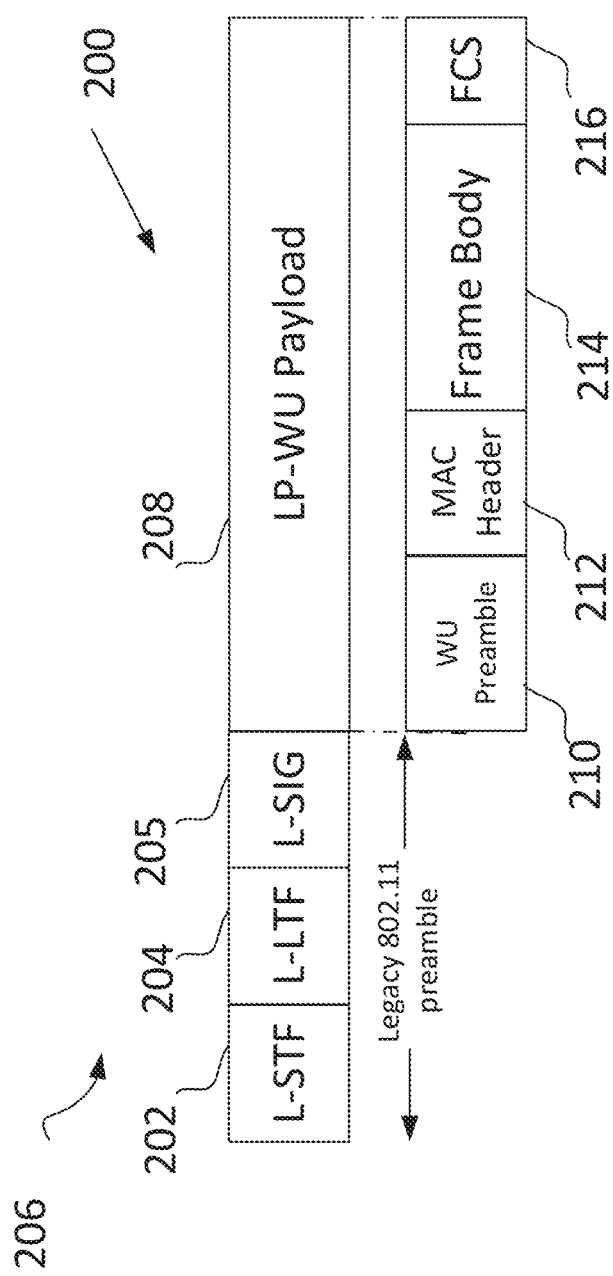
FIG. 2 illustrates a radio architecture for an AP from the BSS of FIG. 1 in accordance with some demonstrative embodiments.

Referring next to FIG. 2, a LP-WU packet 200 according to an exemplary embodiment is shown along with the legacy preamble portion 206 and a LP-WU payload 208. LP-WU packet 200 may, for example, correspond to the LP-WU packet 128 of FIG. 1, legacy preamble portion 206 in FIG. 2 may correspond to legacy preamble portion 130 of FIG. 1, and LP-WU payload 208 of FIG. 2 may correspond to wake-up portion 132 of FIG. 1. The legacy preamble portion 206 may be transmitted on a channel bandwidth in compliance with the protocol used by the main radio system of the AP sending the LP-WU packet, such as with 802.11ax, and the payload 208 may be transmitted on a 2.03125 MHz, 4.0625 MHz, or 8.28125 MHz channel in compliance with LP-WU. Legacy preamble portion 206 may include a legacy short-training field (L-STF) 202, a legacy long training field (L-LTF) 204, and a legacy signal (L-SIG) field 205. In some demonstrative embodiments, a LP-WUR may ignore the legacy preamble 206. A purpose of the legacy preamble 206 would be to allow third-party 802.11 STAs to detect the beginning of the LP-WU packet through L-STF 202, and the end of the same through information within L-SIG 205. Thus, a third-party 802.11 STA, having received the legacy preamble 206, would know to set its Network Allocation Vector (NAV) and to refrain from transmitting until the end of the LP-WU packet. The L-SIG may convey information regarding a length of the LP-WU payload 308. In this way, a LP-WU packet would have a structure that would allow coexistence with third-party STAs.

Referring still to FIG. 2, LP-WU payload 208 may include a wake-up preamble 210, a MAC header 212, a frame body 214, and a frame check sequence field (FCS) 216 for error correction. The LP-WU payload may include information in a field, such as in the MAC header 212 or in the frame body 214, regarding an identifier/address for the STA for which the LP-WU packet is destined.

In some demonstrative embodiments, LP-WU payload 208 may use a different modulation as compared with the modulation of the preamble, for example, a lower modulation. For example, LP-WU payload 208 may be modulated using OOK modulation, the wake-up portion including a series of 1's and 0's, while the legacy preamble may be OFDM modulated using binary phase shift keying (BPSK), although embodiments are not so limited.

The wake-up preamble 210 may include a sequence of wake-up pulses, and may be generated by OOK modulation of a pattern including the series of 1's and 0's (e.g., [1 1 0 . . . 1 0]). According to an exemplary embodiment, the MAC header 212 may be a header that includes a source address or identifier for the source generating the pulse (for example, AP 102 of FIG. 1), or a destination address or identifier for the STA to which the LP-WU packet is destined or both (for example STA 108 of FIG. 1). In the alternative, the frame body or LP-WU payload 208 may be the body of the frame that includes one or more of the above identifiers. The identifier may be an identifier of one or more LP-WURs within STA(s) to which the LP-WU packet may be addressed. The FCS 215 may include information for a LP-WUR to check the integrity of the payload 208.

As noted previously, packet 200 may be used to cause a wake-up of the main radio system, such as an 802.11ax radio, such that this main radio system could, after waking up, demodulate subsequent OFDMA signals from the transmitter that sent the multiplexed OFDMA signal including the OOK LP-WU signal, and/or from other transmitters.

Considering now FIG. 1 in conjunction with FIG. 2, LP-WU packet 128 may be addressed to STA 108 to wake up main radio system 110 through LP-WUR 112. The legacy preamble portion 130 of the LP-WU packet 128 may be used by STA 118 and by STA 134, in this example third-party STAs, to set their respective NAVs, in part through information regarding the length of wake-up portion 132 provided in the L-SIG of preamble 130, corresponding for example to L-SIG 205 of FIG. 2. However, although legacy preamble 130 may allow coexistence between AP 102 and STAs 118 and 134, the above-described mechanism would work only if the third-party STAs 118 and 134 are on/active to receive the legacy preamble 130. For example, if the main radio system 120 of third-party STA 118 is off, which it very well could be, it could miss the legacy preamble 130 entirely, and wake-up only thereafter in order to transmit signals. In such instances, in 802.11 Wi-Fi protocols such as 802.11ax, 802.11ac, 802.11-2012, 802.11n and others, the third-party STA 118 or 134 would rely on energy detection in order to determine whether a measured power over a predetermined time period is above an energy detection threshold defined for the main radio system. In the case of an 802.11 compliant Wi-Fi radio system, this energy level may be defined as −62 dBm. However, if the LP-WU packet is modulated using OOK, and a ratio of transmitted "1's" (corresponding to energy being transmitted on the wireless medium) and "0's" (corresponding to silence periods or no energy transmitted on the wireless medium) of the wake-up packet will be approximately 1, an average power of the LP-WU packet after the legacy preamble 130 as measured by third-party STA 118 or 134 would be about 3 dB lower than that of an 802.11 Wi-Fi packet. For example, if a received power of the 1's in the OOK modulated wake-up portion 132 is −61 dBm, the average received power would become −3 dBm lower, that is, −64 dBm. In such a case, a third-party 802.11 Wi-Fi STA, such as STA 118 or STA 134, using an energy detection threshold of −62 dBm may not detect the presence of the OOK modulated wake-up portion 132, having already missed the legacy preamble portion 130. In such a case, third-party STA 118 or 134 may initiate a Wi-Fi packet transmission before the end of the LP-WU packet transmission, which may cause a collision with the LP-WU packet.

According to some demonstrative embodiments, a transmit power of a payload portion of a wake-up packet may be set to be higher than a transmit power of a legacy portion of the wake-up packet by a predetermined amount, such that an average received power of the payload portion at a third-party station is equal to an average received power of the legacy portion of the wake-up packet at the third-party station. In the above example, according to some demonstrative embodiments, where the wake-up packet is a LP-WU packet, a transmit power of the OOK modulated wake-up portion of the LP-WU packet may be raised with respect to transmit power of the legacy preamble such that, at the third-party STAs, the average received power of the OOK modulated wake-up portion is equal to the average received power of the legacy preamble at the third-party STAs. Recall that, if the wake-up portion is an OOK modulated payload, the transmit power associated with the 1's during transmission would be averaged when received by virtue of the presence of the 0's, which explains in part why raising the transmit power on the OOK signal with respect to the transmit power of the OFDM legacy preamble could still result in equal average received powers for both signals. The average received power of the legacy preamble, equal to an energy detection threshold of a main radio system of a third-party STA, may, in the case of an 802.11 Wi-Fi third-party, be equal to −62 dBm. In such a case, the transmit power of the OOK modulated payload portion may be raised, according to one embodiment, by at least 3 dB with respect to the transmit power of the legacy preamble, which would result, at the third party STAs, in an average received power for both the legacy preamble and the wake-up portion of −62 dBm. According to some demonstrative embodiments, the transmit power may be boosted based on the ratio of 3's and 0's of the OOK modulated wake-up packet. For example, if the ratio is 1, then the boost may be 3 dB, if the ratio is 1/2 then the boost may be 4.7 dB, and if the ratio is 1/3 then the boost may be 6 dB, etc.

Advantageously, according to the above mechanism, even if a third-party STA is to miss the legacy preamble portion of a wake-up payload, and wake up only thereafter, it could use its energy detection threshold mechanism to detect the presence of the wake-up payload and set its NAV accordingly to avoid the possibility of collisions, thus improving system performance.

Referring back to FIG. 1, STAs 108, 118 and 134 may include wireless transmit and receive devices such as cellular telephones, smart telephones, handheld wireless devices, wireless glasses, wireless watches, wireless personal devices, tablets, or other devices that may be transmitting and receiving using the any of the IEEE 802.11 protocols such as IEEE 802.11ax or another wireless communication protocol. In some demonstrative embodiments, STAs 108, 118 and/or 134 may be compliant with the 802.11ax communication protocol, and may be termed high efficiency (HE) stations. An 802.11ax or High Efficiency Wi-Fi (HEW) signal may be communicated on a subchannel that may have a bandwidth of 20 MHz, 40 MHz, or 80 MHz, 160 MHz, or 320 MHz contiguous bandwidths or an 80+80 MHz (160 MHz) non-contiguous bandwidth. In some demonstrative embodiments, the bandwidth of a HEW subchannel may be 2.03125 MHz, 4.0625 MHz, 8.28125 MHz, a combination thereof, or another bandwidth that is less or equal to the available bandwidth may also be used. The subchannel may include a number of tones or tones, such as 26, and these tones may include a combination of data tones and other tones. The other tones may include DC nulls, guard intervals, or may be used for any purpose other than carrying data.

A HEW packet may be configured for transmitting a number of spatial streams, which may be in accordance with MU-MIMO. In other embodiments, the AP and STAs in FIG. 1 may also implement different technologies such as code division multiple access (CDMA) 2000, CDMA 2000 1×, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), Bluetooth®, or other technologies.

In some demonstrative embodiments, STA 108, 118 and/or 134 may include Internet-of-Things (IoT) devices that operate in accordance with IEEE 802.11ax or another wireless communication protocol of 802.11. The IoT devices may operate on a smaller sub-channel than the 802.11ax devices. For example, the IoT devices may operate on 2.03125 MHz, 4.0625 MHz, or 8.28125 MHz channels/subchannels. The IoT devices may be sensors designed to measure one or more specific parameters of interest such as temperature sensor, humidity, or location-specific sensors. IoT devices may be connected to a sensor hub (not illustrated), and may upload data to the sensor hub. The sensor hub may upload the data to an access gateway (not illustrated) that may connect several sensor hubs to a cloud sever. The AP may act as the access gateway in accordance with some demonstrative embodiments. The AP may act as the sensor hub in accordance with some demonstrative embodiments. In some other demonstrative embodiments, the IoT devices may need to consume very low average power in order to perform a packet exchange with the AP.

The AP may transmit a LP-WU packet to various ones of the stations that have LP-WUR functionality. A LP-WUR included in a STA, such as LP-WUR 112 or 122, may operate on a sub-channel smaller than the operating range of the AP. Stations that are not a recipient of the LP-WU packet should refrain from communicating, based on the legacy preamble portion 130 of the LP-WU packet as noted previously.

In accordance with some demonstrative embodiments, with the assumption that the LP-WU packet 128 is addressed to STA 108, LP-WUR 112 of STA 108 may receive the LP-WU packet 128, decode it, and consequently wake up the main radio system of STA 108, which then may contend for the wireless medium with STA 118 and STA 134. In some demonstrative embodiments, after the main radio system of STA 108 is woken up, it may communicate with the AP in accordance with a non-contention based access technique after being woken up and obtaining the UL transmit configuration from a trigger packet which may indicate an uplink (UL) UL-MU-MIMO and/or UL OFDMA control period.

In some demonstrative embodiments, a multiple-access technique used during a HEW control period may be a scheduled OFDMA technique, although this is not a requirement. In some demonstrative embodiments, the multiple access technique may be a time-division multiple access (TDMA) technique or a frequency division multiple access (FDMA) technique. In some demonstrative embodiments, the multiple access technique may be a space-division multiple access (SDMA) technique.

As used in this disclosure, "tone" and "subcarrier" are used interchangeably. Moreover, when "at least one of" a given set or list of items connected with "and" is mentioned herein, what is meant is a reference to either one of the noted items, or any combination of the items. For example, as used herein, "at least one of A, B and C" means "A, or B, or C, or A and B, or A and C, or B and C, or A and B and C."

Figure 3:
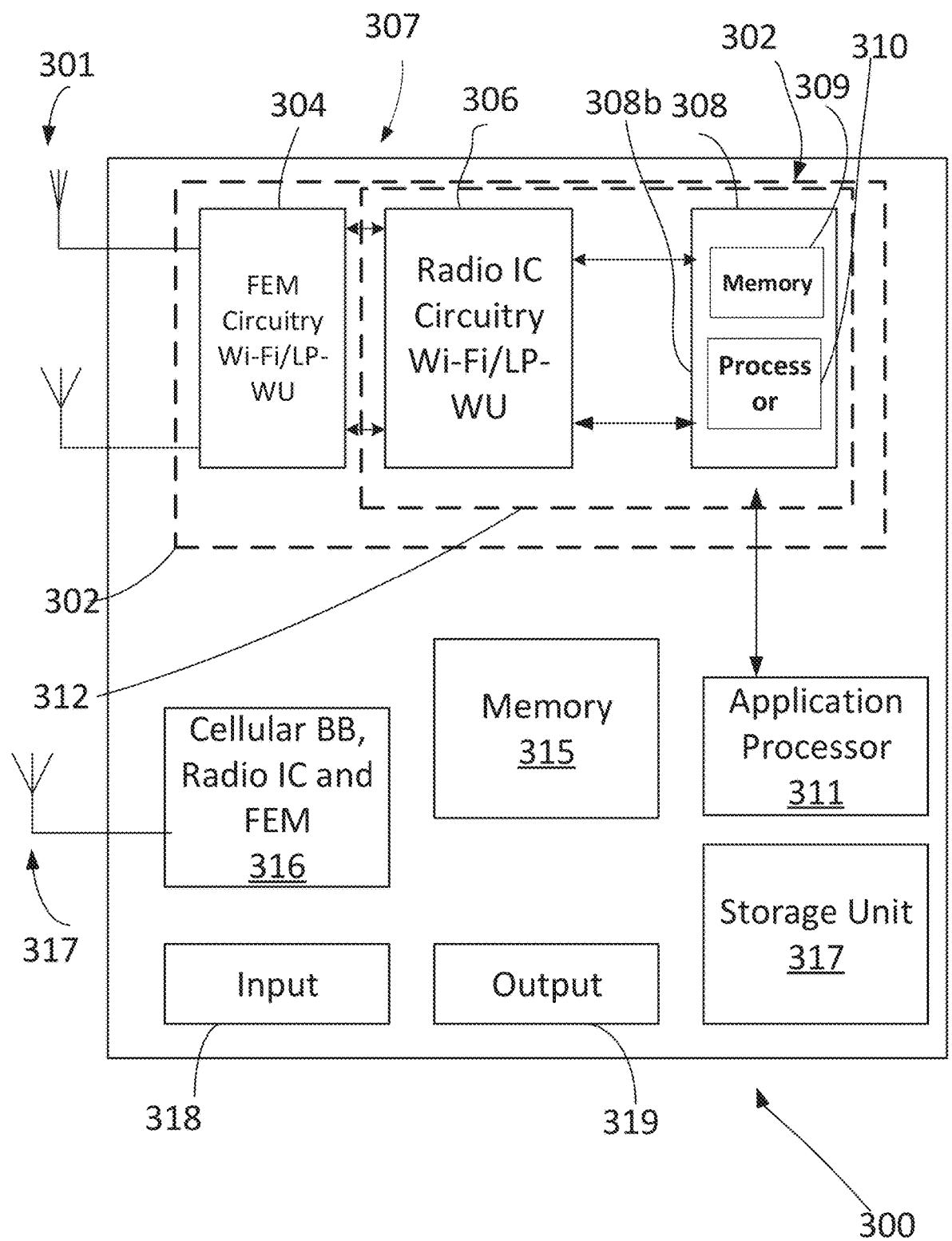
FIG. 3 illustrates a Low Power Wake-Up (LP-WU) packet plus a legacy preamble in the time domain in accordance with some demonstrative embodiments.

Reference will now be made to FIG. 3, which depicts one embodiment of a wireless communication apparatus 300 such as the AP 102 of FIG. 1. The wireless communication apparatus 300 may include a wireless communication system such as radio system 302 (which may correspond to radio system 104 of FIG. 1). Radio system 302 may include radio front-end module (FEM) circuitry 304, radio integrated circuit (radio IC) 306 and baseband processor 308. The radio IC 306 and baseband processor 308 may be positioned on the same integrated circuit card (IC) 312, although embodiments are not so limited. The radio IC 306 and FEM circuitry 304 may together be referred to as a transceiver system 307, and it is to be understood that radio IC 306 and FEM circuitry 304 may, in one embodiment, have their functionality integrated, although embodiments are not so limited. The wireless communication apparatus 300 as shown includes both Wi-Fi functionality and LP-WU functionality, although embodiments are not so limited. LP-WUR/LP-WU may refer to Medium Access Control Layer and Physical Layer specifications in accordance with efforts within the Institute of Electrical and Electronics Engineers (IEEE)'s regarding a LP-WUR standard/802.11ba standard. In the shown instance of a wireless communication apparatus 300 including an AP, the LP-WU functionality may not necessarily include functionality necessary to receive and decode LP-WU packets to wake up a main radio system in the AP, but would include the ability of the radio system to transmit LP-WU packets addressed to one or more STAs to wake up respective main radio systems within those STAs.

In FIG. 3, it is further to be noted that the representation of a single antenna may be interpreted to mean one or more antennas. Furthermore, although FIG. 3 shows a single radio IC block 306, a single FEM circuitry block 304 and a single baseband circuitry block 308, where each of the above blocks could include both Wi-Fi and LP-WU functionality, these blocks are to be viewed as representing the possibility of one or more circuitry blocks, where potentially one set of distinct circuitry blocks, for example, a distinct FEM circuitry, a distinct radio IC, and/or a distinct LP-WU baseband circuitry would work to provide the noted LP-WU functionality. In the alternative, such functionality could be integrated either in part or in whole within the Wi-Fi circuitry. In a further alternative, components providing LP-WU functionality could be provided, according to some demonstrative embodiments, within circuitry blocks positioned off of the IC 312 or radio system 302, for example adjacent the application processor 311. Also, as used herein, "processing circuitry" or "processor" may include one or more distinctly identifiable processor blocks.

FEM circuitry 304 may include both Wi-Fi functionality (which would allow the processing of Wi-Fi signals) and LP-WU functionality (which, in the case of the FEM, would mean at least the ability to transmit LP-WU packets). The FEM circuitry 304 may include a receive signal path comprising circuitry configured to operate on Wi-Fi signals received from one or more antennas 301, to amplify the received signals and to provide the amplified versions of the received signals to the radio IC 306 for further processing. The FEM may further include a receive signal path comprising circuitry configured to operate on LP-WU signals received from one or more antennas 301, to amplify the received signals and to provide the amplified versions of the received signals to the radio IC 306 for further processing. FEM circuitry 304 may also include a transmit signal path which may include circuitry configured to amplify Wi-Fi signals provided by the radio IC 306 for wireless transmission by one or more of the antennas 301. FEM circuitry 304 may also include a transmit signal path which may include circuitry configured to amplify LP-WU signals provided by the radio IC 306 for wireless transmission by one or more of the antennas 301. In the case of the wireless communication apparatus 300 being an AP, the transmit signal path would include LP-WU functionality to transmit LP-WU packets. The antennas may include directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result.

Radio IC 306 may include both Wi-Fi and LP-WU functionality, and may include therein a distinct LP-WU radio to process LP-WU signals. In the case of an AP, the radio IC 306 would be adapted to at least process LP-WU signals for transmission, and may optionally also be adapted to process LP-WU signals that are received, although embodiments are not so limited. Radio IC 306 as shown may include a receive signal path which may include circuitry to down-convert Wi-Fi signals, and optionally LP-WU signals, received from the FEM circuitry 304 and provide baseband signals to baseband processor 308. The radio IC 306 may also include a transmit signal path which may include circuitry to up-convert baseband signals provided by the baseband processor 308 and provide RF output signals to the FEM circuitry 304 for subsequent wireless transmission by the one or more antennas 301. In any event, the radio IC 306 would, with respect to transmission, provide at a minimum the ability to up-convert both Wi-Fi and LP-WU baseband signals and provide corresponding RF output signals to the FEM circuitry 304 for transmission.

Baseband processing circuity 308 may include processing circuitry that provides Wi-Fi functionality (hereinafter, main baseband processor), and processing circuitry that provides at least transmit LP-WU functionality (hereinafter low-power baseband processor). In the instant description, the baseband processing circuitry 308 may include a memory 309, such as, for example, a set of RAM arrays in a Fast Fourier Transform or Inverse Fast Fourier Transform block (not shown) of the baseband processor 308. Processing circuitry 310 may include control logic to process the signals received from the receive signal path of the radio IC 306, such as Wi-Fi signals, and, optionally, LP-WU signals. Baseband processing circuitry 308 is also configured to also generate corresponding baseband signals for the transmit signal path of the radio IC 306, and may further include physical layer (PHY) and medium access control layer (MAC) circuitry, and may further interface with application processor 311 for generation and processing of the baseband signals and for controlling operations of the radio IC 306. Baseband processing circuitry 308 may be adapted to generate and as a result cause transmission of both Wi-Fi and LP-WU signals, such as the generation of LP-WU packets similar to packet 200 of FIG. 2.

In some demonstrative embodiments, the front-end module circuitry 304, the radio IC 306, and baseband processor 308 may be provided on a single radio card, such as radio system 302. In some other embodiments, the one or more antennas 301, the FEM circuitry 304 and the radio IC 306 may be provided on a single radio card. In some other embodiments, the radio IC 306 and the baseband processor 308 may be provided on a single chip or integrated circuit (IC), such as IC 312.

In some demonstrative embodiments, the wireless communication apparatus 300 of FIG. 3 may include a Wi-Fi radio system and may be configured for Wi-Fi communications, although the scope of the embodiments is not limited in this respect. In some of these embodiments, the wireless communication apparatus 300 may be configured to receive and transmit OFDM or OFDMA communication signals over a multicarrier communication channel.

In some other embodiments, the wireless communication apparatus 300 may be configured to transmit and receive signals transmitted using one or more modulation techniques other than OFDM or OFDMA, such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, and On-Off Keying (OOK), although the scope of the embodiments is not limited in this respect.

In some demonstrative embodiments, the wireless communication apparatus 300 may include other radio systems, such as a cellular radio system 316 configured for cellular (e.g., 3GPP such as LTE, LTE-Advanced or 5G communications).

In some IEEE 802.11 embodiments, the wireless communication apparatus 300 may be configured for communication over various channel bandwidths including bandwidths having center frequencies of 900 MHz, 2.03125 MHz, 2.4 GHz, 4.0625 MHz, 5 GHz, 8.28125 MHz and bandwidths of less than 5 MHz, or of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths), or any combination of the above frequencies or bandwidths, or any frequencies or bandwidths between the ones expressly noted above. In some demonstrative embodiments, a 320 MHz channel bandwidth may be used. The scope of the embodiments is not limited with respect to the above center frequencies however.

Referring still to FIG. 3, in some demonstrative embodiments, wireless communication apparatus 300 may further include an input unit 318, an output unit 319, a memory unit 315. Wireless communication apparatus 300 may optionally include other suitable hardware components and/or software components. In some demonstrative embodiments, some or all of the components of wireless communication apparatus 300 may be enclosed in a common housing or packaging, and may be interconnected or operably associated using one or more wired or wireless links. In other embodiments, components of wireless communication apparatus 300 may be distributed among multiple or separate devices.

In some demonstrative embodiments, application processor 311 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Application processor 311 may execute instructions, for example, of an Operating System (OS) of wireless communication apparatus 300 and/or of one or more suitable applications.

In some demonstrative embodiments, input unit 318 may include, for example, one or more input pins on a circuit board, a keyboard, a keypad, a mouse, a touch-screen, a touch-pad, a track-ball, a stylus, a microphone, or other suitable pointing device or input device. Output unit 319 may include, for example, one or more output pins on a circuit board, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory 315 may include, for example, a Random-Access Memory (RAM), a Read-Only Memory (ROM), a Dynamic RAM (DRAM), a Synchronous DRAM (SD-RAM), a flash memory, a volatile memory, a non-volatile memory, a cache memory, a buffer, a short-term memory unit, a long-term memory unit, or other suitable memory units.

Storage unit 317 may include, for example, a hard disk drive, a floppy disk drive, a Compact Disk (CD) drive, a CD-ROM drive, a DVD drive, or other suitable removable or non-removable storage units. Memory unit 315 and/or storage unit 317, for example, may store data processed by wireless communication apparatus 300.

Referring still to the demonstrative embodiment of FIG. 3, circuitry may exist within FEM 304, within radio IC 306 and within baseband processing circuitry 308 that provide LP-WU functionality, such as LP-WU transmit only functionality, or LP-WU transmit and receive functionality. According to some other embodiments, the apparatus 300 shown in FIG. 3 may have more than one FEM or radio IC or baseband circuitry to provide the Wi-Fi plus LP-WU functionality.

According to some demonstrative embodiments, a wireless communication system, such as a radio system of an AP, may comprise a memory, processing circuitry coupled to the memory, and a transceiver system. The processing circuitry may include logic to generate a wake-up packet addressed to another wireless communication system, the wake-up packet including a legacy preamble portion and a wake-up portion, wherein: the legacy preamble portion is modulated according to a first modulation rate and includes information to allow a third-party station to refrain from transmitting during a length of the wake-up packet; and the wake-up portion is modulated according to a second modulation rate lower than the first modulation rate and includes information to wake-up a radio system of the other wireless communication system. The transceiver system may be configured to transmit the legacy preamble using a first transmit power level, and to transmit the wake-up portion using a second transmit power level higher than the first transmit power level by a predetermined amount such that an average received power of the wake-up portion is equal to an average received power of the legacy portion at the third-party station. For example, the predetermined amount is 3 dB, and the average received power of the wake-up portion and of the legacy portion at the third-party station is −62 dBm.

The wireless device packet would be configured to generate the wake-up packet such that the legacy preamble portion includes a legacy short training field (L-STF), a legacy long training field (L-LTF) and a legacy signal field (L-SIG), the L-SIG including length information for the wake-up packet. The legacy preamble may be modulated using binary phase shift keying (BPS K), and the wake-up portion may be modulated using On-Off-Keying (OOK). The wake-up portion may include a wake-up preamble, a medium access control (MAC) header including an address of the other wireless device, a frame body and a frame check sequence (FCS) including cyclic redundancy check (CRC) information.

Reference will now be made to FIGS. 1, 2, and 3 in order to describe some demonstrative embodiments, although it is to be noted that embodiments are not limited to what is described below and shown with respect to FIGS. 1, 2, and 3, or any of the other figures included herein.

According to some demonstrative embodiments, a wireless communication system, such as wireless communication system 300 of FIG. 3, for example one that corresponds to radio system 302 within AP 102 of FIG. 1, may comprise a memory 309, processing circuitry 310 coupled to the memory 309, and a transceiver system, such as transceiver system 307 of FIG. 3, coupled to the processing circuitry 309. The processing circuitry 210 may include logic to generate a wake-up packet, such as, for example, an LP-WU packet 200 of FIG. 2 addressed to another wireless communication system, such as for example STA 108 of FIG. 1. The wake-up packet, for example LP-WU packet 200 of FIG. 2, may include a legacy preamble portion such as preamble portion 206 of FIG. 2, and a wake-up portion, such as wake-up portion 208 of FIG. 2. The legacy preamble portion may be modulated according to a first modulation rate, such as, for example, BPSK, and may include information to allow a third-party station to refrain from transmitting during a length of the wake-up packet, for example to allow a third-party station to set its NAV. The wake-up portion may be modulated according to a second modulation rate lower than the first modulation rate, such as OOK, and may include information to wake-up a radio system of the other wireless communication system, such as main radio system 110 of STA 108 in FIG. 1. The transceiver system 307 within the wireless communication apparatus 300 of FIG. 3, corresponding for example to AP 102 of FIG. 1, may transmit the legacy preamble using a first transmit power level, and transmit the wake-up portion using a second transmit power level higher than the first transmit power level by a predetermined amount. The predetermined amount would be such that an average received power of the wake-up portion at a receiver is equal to an average received power of the legacy portion at the third-party station. For example, the predetermined amount may be 3 dB, such that the average received power of the wake-up portion and of the legacy portion at the third-party station is −62 dBm, although embodiments are not so limited.

Referring next to FIGS. 4a and 4b, these figures show transmit power plotted in the time domain for a wake-up packet generated not using power enhancement according to some demonstrative embodiments (FIG. 4a), and a wake-up packet using a 3 dB power enhancement according to demonstrative embodiments (FIG. 4b). FIGS. 4a and 4b each show transmit power for the legacy preamble portions 406a (FIG. 4a) and 406b (FIG. 4b), a wake-up preamble 410a (FIG. 4a) and 410b (FIG. 4b), and a LP-WU payload 417a (FIG. 4a) and 417b (FIG. 4b), each of the payloads including a MAC header, a frame body and a FCS. The wake-up packet of FIGS. 4a and 4b may have a structure similar for example to the structure of LP-WU payload 128 of FIG. 1, or of the LP-WU payload 300 of FIG. 3.

Referring still to FIGS. 4a and 4b, the legacy preamble portions 406a and 406b show consistent transmit power over time, resulting in an average receive power at the receiver side of about −62 dBm, while, the LP-WU payload portions 417*a* and 417*b*, by virtue of their OOK modulation, show intermittent periods of transmit power presence and absence, resulting in a lower average transmit power at the receiver side than if the transmit power were consistent through time. For example, in FIG. 4*a*, if a received power of the LP-WU payload part, which may be OOK modulated, is −61 dBm, the average received power would be −64 dBm, and a third-party STA using the energy detection threshold of −62 dBm may not be able to detect the presence of the wake-up packet on the wireless medium and initiate a packet transmission before the end of the wake-up packet transmission. However, as seen in FIG. 4*b*, a transceiver system, such transceiver system 307 of FIG. 3, may set a transmit power of the legacy 802.11 preamble 406*b* for example at a power level $P_{tx\_legacy\_preamble}$, and transmit the legacy 802.11 preamble 406*b* using this power level. At the end of the legacy 802.11 preamble 406*b*, however, the transceiver system 307, for example through FEM circuitry 304, may increase the transmit power for the LP-WU payload 417*b*, to a new transmit power level $P_{tx\_OOK} = P_{tx\_legacy\_preamble} + 3$ dB and transmit payload 417*b* at this second transmit power level, as shown in FIG. 4*b*.

Figure 5:
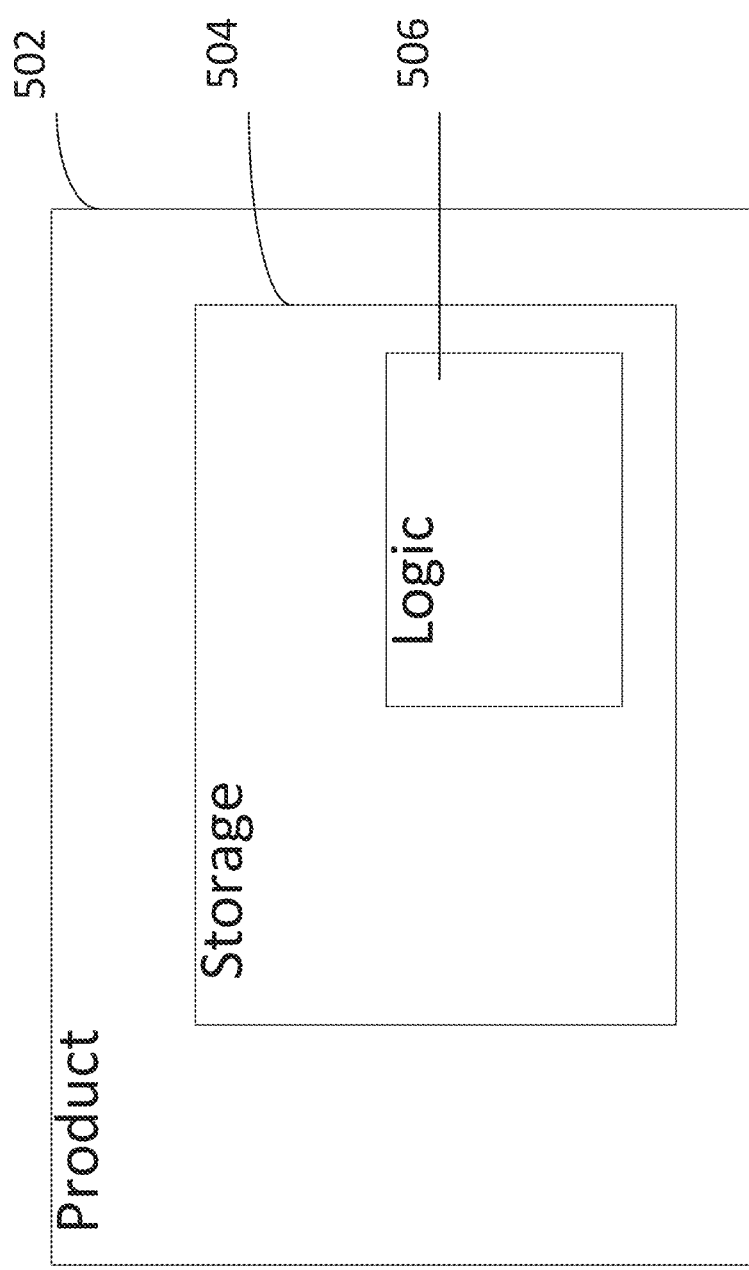
FIG. 5 illustrates a product of manufacture in accordance with some demonstrative embodiments.

FIG. 5 illustrates a product of manufacture 500, in accordance with some demonstrative embodiments. Product 500 may include one or more tangible computer-readable non-transitory storage media 502, which may include computer-executable instructions, e.g., implemented by logic 504, operable to, when executed by at least one computer processor, enable the at least one computer processor to implement one or more operations at an AP, and/or to perform one or more operations described above with respect to FIGS. 1, 2, 3 and 4, and/or one or more operations described herein. The phrase "non-transitory machine-readable medium" is directed to include all computer-readable media, with the sole exception being a transitory propagating signal.

In some demonstrative embodiments, product 500 and/or storage media 502 may include one or more types of computer-readable storage media capable of storing data, including volatile memory, non-volatile memory, removable or non-removable memory, erasable or non-erasable memory, writeable or re-writeable memory, and the like. For example, storage media 502 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 504 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 504 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

FIG. 6 illustrates a method 600 of using a wireless communication system in accordance with some demonstrative embodiments. The method 600 may begin with operation 602, which includes generating a wake-up packet addressed to another wireless communication system, the wake-up packet including a legacy preamble portion and a wake-up portion, wherein the legacy preamble portion is modulated according to a first modulation rate and includes information to allow a third-party station to refrain from transmitting during a length of the wake-up packet, and wherein the wake-up portion is modulated according to a second modulation rate lower than the first modulation rate and includes information to wake-up a radio system of the other wireless communication system. At operation 604, the method includes causing transmission of the legacy preamble using a first transmit power level. At operation 606, the method further includes causing transmission of the wake-up portion using a second transmit power level higher than the first transmit power level by a predetermined amount such that an average received power of the wake-up portion is equal to an average received power of the legacy portion at the third-party station.

Some demonstrative embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. Those instructions may then be read and executed by one or more processors to cause the wireless communication system of FIG. 3 to perform the methods and/or operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

EXAMPLES

The following examples pertain to further embodiments.

Example 1 includes a wireless communication system comprising processing circuitry, and a transceiver system coupled to the processing circuitry, wherein: the processing circuitry includes logic to generate a wake-up packet addressed to another wireless communication system, the wake-up packet including a legacy preamble portion and a wake-up portion, wherein the legacy preamble portion is modulated according to a first modulation rate and includes information to allow a third-party station to refrain from transmitting during a length of the wake-up packet, and wherein the wake-up portion is modulated according to a second modulation rate lower than the first modulation rate and includes information to wake-up a radio system of the other wireless communication system; and the transceiver system to transmit the legacy preamble using a first transmit power level, and to transmit the wake-up portion using a second transmit power level higher than the first transmit power level by a predetermined amount such that an average received power of the wake-up portion is equal to an average received power of the legacy portion at the third-party station.

Example 2 includes the subject matter of Example 1, and optionally, wherein the legacy preamble portion includes a legacy short training field (L-STF), a legacy long training field (L-LTF) and a legacy signal field (L-SIG), the L-SIG including length information for the wake-up packet.

Example 3 includes the subject matter of Example 1, and optionally, wherein the first modulation rate includes binary phase shift keying (BPSK).

Example 4 includes the subject matter of any one of Examples 1-3, and optionally, wherein the second modulation rate includes On-Off-Keying (OOK), the wake-up portion including a series of 1's and 0's.

Example 5 includes the subject matter of any one of Examples 1-3, and optionally, wherein the wake-up portion includes a wake-up preamble, a medium access control (MAC) header including an address of the other wireless communication system, a frame body and a frame check sequence (FCS) including cyclic redundancy check (CRC) information.

Example 6 includes the subject matter of Example 4, and optionally, wherein the predetermined amount is based on a ratio of the number of 1's to the number of 0's of the wake-up packet.

Example 7 includes the subject matter of Example 6, and optionally, wherein the predetermined amount is 4.7 dB if the ratio is equal to 1/2, and is 6 dB if the ratio is equal to 1/3.

Example 8 includes the subject matter of any one of Examples 1-3, and optionally, wherein the predetermined amount is 3 dB, and the average received power of the wake-up portion and of the legacy portion at the third-party station is −62 dBm.

Example 9 includes the subject matter of any one of Examples 1-3, and optionally, wherein: the wake-up portion has a pulse bandwidth of 2.03 MHz or 4.06 MHz; a frequency spacing between tones in the wake-up portion is 78.125 kHz or 312.5 kHz; and the wake-up portion includes 26 tones or 13 tones per symbol.

Example 10 includes the subject matter of Example 9, and optionally, wherein the wake-up portion has a symbol duration of 4 μsec.

Example 11 includes the subject matter of any one of Examples 1-3, and optionally, further including a baseband processor including the memory and the processing circuitry, wherein the transceiver system includes a radio integrated circuit (radio IC) coupled to the baseband processor, and radio front end module circuitry coupled to the radio integrated circuit.

Example 12 includes the subject matter of Example 11, and optionally, wherein the front-end module circuitry includes: a receive signal path comprising circuitry configured to amplify higher modulation signals received from one or more antennas and to provide an amplified version of the received higher modulation signals to the radio IC, the higher modulation signals being at a modulation rate equal to or greater than the first modulation rate; and a transmit signal path including circuitry configured to amplify higher modulation signals provided by the radio IC for wireless transmission by the one or more antennas; a transmit signal path including circuitry configured to amplify signals modulated according to the second modulation rate provided by the radio IC for wireless transmission by the one or more antennas.

Example 13 includes the subject matter of Example 12, and optionally, wherein the higher modulation signals include Wi-Fi signals, and the signals modulated according to the second modulation rate include signals in conformance with an Institute of Electrical and Electronics Engineers 802.11ba wireless communication protocol.

Example 14 includes the subject matter of Example 12, and optionally, further including one or more antennas coupled to the front-end module.

Example 15 includes a product comprising one or more tangible computer-readable non-transitory storage media comprising computer-executable instructions operable to, when executed by at least one computer processor, enable the at least one computer processor to implement operations at a wireless communication system, the operations comprising: generating a wake-up packet addressed to another wireless communication system, the wake-up packet including a legacy preamble portion and a wake-up portion, wherein the legacy preamble portion is modulated according to a first modulation rate and includes information to allow a third-party station to refrain from transmitting during a length of the wake-up packet, and wherein the wake-up portion is modulated according to a second modulation rate lower than the first modulation rate and includes information to wake-up a radio system of the other wireless communication system; causing transmission of the legacy preamble using a first transmit power level; and causing transmission of the wake-up portion using a second transmit power level higher than the first transmit power level by a predetermined amount such that an average received power of the wake-up portion is equal to an average received power of the legacy portion at the third-party station.

Example 16 includes the subject matter of Example 15, and optionally, wherein the legacy preamble portion includes a legacy short training field (L-STF), a legacy long training field (L-LTF) and a legacy signal field (L-SIG), the L-SIG including length information for the wake-up packet.

Example 17 includes the subject matter of Example 15, and optionally, wherein the first modulation rate includes binary phase shift keying (BPSK).

Example 18 includes the subject matter of any one of Examples 15-17, wherein the second modulation rate includes On-Off-Keying (OOK), the wake-up portion including a series of 1's and 0's.

Example 19 includes the subject matter of any one of Examples 15-17, wherein the wake-up portion includes a wake-up preamble, a medium access control (MAC) header including an address of the other wireless communication system, a frame body and a frame check sequence (FCS) including cyclic redundancy check (CRC) information.

Example 20 includes the subject matter of Example 18, and optionally, wherein the predetermined amount is based on a ratio of the number of 1's to the number of 0's of the wake-up packet.

Example 21 includes the subject matter of Example 20, and optionally, wherein the predetermined amount is 4.7 dB if the ratio is equal to 1/2, and is 6 dB if the ratio is equal to 1/3.

Example 22 includes the subject matter of any one of Examples 15-17, wherein the predetermined amount is 3 dB, and the average received power of the wake-up portion and of the legacy portion at the third-party station is −62 dBm.

Example 23 includes the subject matter of any one of Examples 15-17, wherein: the wake-up portion has a pulse bandwidth of 2.03 MHz or 4.06 MHz; a frequency spacing between tones in the wake-up portion is 78.125 kHz or 312.5 kHz; and the wake-up portion includes 26 tones or 13 tones per symbol.

Example 24 includes the subject matter of Example 23, and optionally, wherein the wake-up portion has a symbol duration of 4 μsec.

Example 25 includes the subject matter of any one of Examples 15-17, wherein the operations further include: amplifying higher modulation signals received from one or more antennas, the higher modulation signals being at a modulation rate equal to or greater than the first modulation rate; providing an amplified version of the higher modulation signals to a radio integrated circuit (radio IC) for further processing, and amplifying higher modulation signals provided by the radio IC for wireless transmission by the one or more antennas; amplifying signals modulated according to the second modulation rate and provided by the radio IC for wireless transmission by the one or more antennas.

Example 26 includes the subject matter of Example 25, and optionally, wherein the higher modulation signals include Wi-Fi signals, and the signals modulated according to the second modulation rate include signals in conformance with an Institute of Electrical and Electronics Engineers 802.11ba wireless communication protocol.

Example 27 includes a method to be performed by a wireless communication system, the method comprising: generating a wake-up packet addressed to another wireless communication system, the wake-up packet including a legacy preamble portion and a wake-up portion, wherein the legacy preamble portion is modulated according to a first modulation rate and includes information to allow a third-party station to refrain from transmitting during a length of the wake-up packet, and wherein the wake-up portion is modulated according to a second modulation rate lower than the first modulation rate and includes information to wake-up a radio system of the other wireless communication system; causing transmission of the legacy preamble using a first transmit power level; and causing transmission of the wake-up portion using a second transmit power level higher than the first transmit power level by a predetermined amount such that an average received power of the wake-up portion is equal to an average received power of the legacy portion at the third-party station.

Example 28 includes the subject matter of Example 27, and optionally, wherein the legacy preamble portion includes a legacy short training field (L-STF), a legacy long training field (L-LTF) and a legacy signal field (L-SIG), the L-SIG including length information for the wake-up packet.

Example 29 includes the subject matter of Example 27, and optionally, wherein the first modulation rate includes binary phase shift keying (BPSK).

Example 30 includes the subject matter of any one of Examples 27-29, and optionally, wherein the second modulation rate includes On-Off-Keying (OOK), the wake-up portion including a series of 1's and 0's.

Example 31 includes the subject matter of any one of Examples 27-29, and optionally, wherein the wake-up portion includes a wake-up preamble, a medium access control (MAC) header including an address of the other wireless communication system, a frame body and a frame check sequence (FCS) including cyclic redundancy check (CRC) information.

Example 32 includes the subject matter of Example 30, and optionally, wherein the predetermined amount is based on a ratio of the number of 1's to the number of 0's of the wake-up packet.

Example 33 includes the subject matter of Example 32, and optionally, wherein the predetermined amount is 4.7 dB if the ratio is equal to 1/2, and is 6 dB if the ratio is equal to 1/3.

Example 34 includes the subject matter of Example 27, and optionally, wherein the predetermined amount is 3 dB, and the average received power of the wake-up portion and of the legacy portion at the third-party station is −62 dBm.

Example 35 includes the subject matter of any one of Examples 27-29, and optionally, wherein: the wake-up portion has a pulse bandwidth of 2.03 MHz or 4.06 MHz; a frequency spacing between tones in the wake-up portion is 78.125 kHz or 312.5 kHz; and the wake-up portion includes 26 tones or 13 tones per symbol.

Example 36 includes the subject matter of Example 35, and optionally, wherein the wake-up portion has a symbol duration of 4 μsec.

Example 37 includes the subject matter of any one of Examples 27-29, and optionally, further comprising: amplifying higher modulation signals received from one or more antennas, the higher modulation signals being at a modulation rate equal to or greater than the first modulation rate; providing an amplified version of the higher modulation signals to a radio integrated circuit (radio IC) for further processing, and amplifying higher modulation signals provided by the radio IC for wireless transmission by the one or more antennas; amplifying signals modulated according to the second modulation rate and provided by the radio IC for wireless transmission by the one or more antennas.

Example 38 includes the subject matter of Example 37, and optionally, wherein the higher modulation signals include Wi-Fi signals, and the signals modulated according to the second modulation rate include signals in conformance with an Institute of Electrical and Electronics Engineers 802.11ba wireless communication protocol.

Example 39 pertains to a wireless communication system including: means for generating a wake-up packet addressed to another wireless communication system, the wake-up packet including a legacy preamble portion and a wake-up portion, wherein the legacy preamble portion is modulated according to a first modulation rate and includes information to allow a third-party station to refrain from transmitting during a length of the wake-up packet, and wherein the wake-up portion is modulated according to a second modulation rate lower than the first modulation rate and includes information to wake-up a radio system of the other wireless communication system; means for causing transmission of the legacy preamble using a first transmit power level; and means for causing transmission of the wake-up portion using a second transmit power level higher than the first transmit power level by a predetermined amount such that an average received power of the wake-up portion is equal to an average received power of the legacy portion at the third-party station.

Example 40 includes the subject matter of Example 39, and optionally, wherein the legacy preamble portion includes a legacy short training field (L-STF), a legacy long training field (L-LTF) and a legacy signal field (L-SIG), the L-SIG including length information for the wake-up packet.

Example 41 includes the subject matter of Example 39, and optionally, wherein the first modulation rate includes binary phase shift keying (BPSK).

Example 42 includes the subject matter of any one of Examples 39-41, and optionally, wherein the second modulation rate includes On-Off-Keying (OOK), the wake-up portion including a series of 1's and 0's.

Example 43 includes the subject matter of any one of Examples 39-41, and optionally, wherein the wake-up portion includes a wake-up preamble, a medium access control (MAC) header including an address of the other wireless communication system, a frame body and a frame check sequence (FCS) including cyclic redundancy check (CRC) information.

Example 44 includes the subject matter of Example 42, and optionally, wherein the predetermined amount is based on a ratio of the number of 1's to the number of 0's of the wake-up packet.

Example 45 includes the subject matter of Example 44, and optionally, wherein the predetermined amount is 4.7 dB if the ratio is equal to 1/2, and is 6 dB if the ratio is equal to 1/3.

Example 46 includes the subject matter of any one of Examples 39-41, and optionally, wherein the predetermined amount is 3 dB, and the average received power of the wake-up portion and of the legacy portion at the third-party station is −62 dBm.

Example 47 includes the subject matter of any one of Examples 39-41, and optionally, wherein: the wake-up portion has a pulse bandwidth of 2.03 MHz or 4.06 MHz; a frequency spacing between tones in the wake-up portion is 78.125 kHz or 312.5 kHz; and the wake-up portion includes 26 tones or 13 tones per symbol.

Example 48 includes the subject matter of Example 47, and optionally, wherein the wake-up portion has a symbol duration of 4 μsec.

Example 49 includes the subject matter of any one of Examples 39-41, and optionally, further comprising: means for amplifying higher modulation signals received from one or more antennas, the higher modulation signals being at a modulation rate equal to or greater than the first modulation rate; means for providing an amplified version of the higher modulation signals to a radio integrated circuit (radio IC); means for amplifying higher modulation signals provided by the radio IC for wireless transmission by the one or more antennas; means for amplifying signals modulated according to the second modulation rate and provided by the radio IC for wireless transmission by the one or more antennas.

Example 50 includes the subject matter of Example 49, and optionally, wherein the higher modulation signals include Wi-Fi signals, and the signals modulated according to the second modulation rate include signals in conformance with an Institute of Electrical and Electronics Engineers 802.11ba wireless communication protocol.

Example 51 includes a product comprising one or more tangible computer-readable non-transitory storage media comprising computer-executable instructions operable to, when executed by at least one computer processor, enable the at least one computer processor to perform the method of any one of the above Examples.

An Abstract is provided. It is submitted with the understanding that it will not be used to limit or interpret the scope or meaning of the claims. The following claims are hereby incorporated into the detailed description, with each claim standing on its own as a separate embodiment.

What is claimed is:

1. A device comprising processing circuitry, and a transceiver system coupled to the processing circuitry, wherein:
the processing circuitry includes logic to generate a wake-up packet addressed to another device, the wake-up packet including a legacy preamble portion and a wake-up portion, wherein the legacy preamble portion is modulated according to a first modulation and includes information to allow a third-party station to refrain from transmitting during a length of the wake-up packet, and wherein the wake-up portion is modulated according to a second modulation different from the first modulation and includes information to be decoded by a wake-up receiver of the other device; and
the transceiver system to transmit the legacy preamble using a first transmit power level, and to transmit the wake-up portion using a second transmit power level higher than the first transmit power level by an amount, wherein the second modulation includes On-Off-Keying (OOK), the wake-up portion including a series of 1's corresponding to energy being transmitted on the wireless medium, and 0's corresponding to no energy transmitted on the wireless medium, and wherein the amount is based on a ratio of the number of 1's to the number of 0's of the wake-up packet.

2. The device of claim 1, wherein the legacy preamble portion includes a legacy short training field (L-STF), a legacy long training field (L-LTF) and a legacy signal field (L-SIG), the L-SIG including length information for the wake-up packet.

3. The device of claim 1, wherein the first modulation includes binary phase shift keying (BPSK).

4. The device of claim 1 wherein the amount is 4.7 dB if the ratio is equal to 1/2, and is 6 dB if the ratio is equal to 1/3.

5. The device of claim 1, wherein the amount is 3 dB.

6. The device of claim 1, wherein:
a frequency spacing between tones in the wake-up portion is 78.125 kHz or 312.5 kHz;
the wake-up portion includes 26 tones or 13 tones per symbol; and
the wake-up portion has a symbol duration of 4 μsec.

7. The device of claim 1, further including a baseband processor including the memory and the processing circuitry, wherein the transceiver system includes a radio integrated circuit (radio IC) coupled to the baseband processor, and radio front end module circuitry coupled to the radio integrated circuit.

8. The device of claim 7, wherein the front-end module circuitry includes:
a receive signal path comprising circuitry configured to amplify higher modulation signals received from one or more antennas and to provide an amplified version of the received higher modulation signals to the radio IC, the higher modulation signals being at a modulation equal to or greater than the first modulation;
a transmit signal path including circuitry configured to amplify higher modulation signals provided by the radio IC for wireless transmission by the one or more antennas; and a transmit signal path including circuitry configured to amplify signals modulated according to the second modulation provided by the radio IC for wireless transmission by the one or more antennas.

9. The device of claim 8, further including one or more antennas coupled to the front-end module.

10. A product comprising one or more tangible computer-readable non-transitory storage media comprising computer-executable instructions operable to, when executed by at least one computer processor, enable the at least one computer processor to implement operations at a wireless communication system, the operations comprising:
generating a wake-up packet addressed to another wireless communication system, the wake-up packet including a legacy preamble portion and a wake-up portion, wherein the legacy preamble portion is modulated according to a first modulation and includes information to allow a third-party station to refrain from transmitting during a length of the wake-up packet, and wherein the wake-up portion is modulated according to a second modulation different from the first modulation and includes information to be decoded by a wake-up receiver of the other wireless communication system;
causing transmission of the legacy preamble using a first transmit power level; and
causing transmission of the wake-up portion using a second transmit power level higher than the first transmit power level by an amount, wherein the second modulation includes On-Off-Keying (OOK), the wake-up portion including a series of 1's corresponding to energy being transmitted on the wireless medium, and 0's corresponding to no energy transmitted on the wireless medium, and wherein the amount is based on a ratio of the number of 1's to the number of 0's of the wake-up packet.

11. The product of claim 10, wherein the legacy preamble portion includes a legacy short training field (L-STF), a legacy long training field (L-LTF) and a legacy signal field (L-SIG), the L-SIG including length information for the wake-up packet.

12. The product of claim 10, wherein the first modulation includes binary phase shift keying (BPSK).

13. The product of claim 10, wherein the amount is 4.7 dB if the ratio is equal to 1/2, and is 6 dB if the ratio is equal to 1/3.

14. The product of claim 10, wherein the amount is 3 dB.

15. The product of claim 10, wherein:
a frequency spacing between tones in the wake-up portion is 78.125 kHz or 312.5 kHz;
the wake-up portion includes 26 tones or 13 tones per symbol; and
the wake-up portion has a symbol duration of 4 μsec.

16. The product of claim 10, wherein the operations further include:
amplifying higher modulation signals received from one or more antennas, the higher modulation signals being at a modulation equal to or greater than the first modulation;
providing an amplified version of the higher modulation signals to a radio integrated circuit (radio IC) for further processing;
amplifying higher modulation signals provided by the radio IC for wireless transmission by the one or more antennas; and
amplifying signals modulated according to the second modulation and provided by the radio IC for wireless transmission by the one or more antennas.

17. A method to be performed by a wireless communication system, the method comprising:
generating a wake-up packet addressed to another wireless communication system, the wake-up packet including a legacy preamble portion and a wake-up portion, wherein the legacy preamble portion is modulated according to a first modulation and includes information to allow a third-party station to refrain from transmitting during a length of the wake-up packet, and wherein the wake-up portion is modulated according to a second modulation lower than the first modulation and includes information to be decoded by a wake-up receiver of the other wireless communication system;
causing transmission of the legacy preamble using a first transmit power level; and
causing transmission of the wake-up portion using a second transmit power level higher than the first transmit power level by an amount, wherein the second modulation includes On-Off-Keying (OOK), the wake-up portion including a series of 1's corresponding to energy being transmitted on the wireless medium, and 0's corresponding to no energy transmitted on the wireless medium, and wherein the amount is based on a ratio of the number of 1's to the number of 0's of the wake-up packet.

18. The method of claim 17, wherein the amount is 4.7 dB if the ratio is equal to 1/2, and is 6 dB if the ratio is equal to 1/3, and is 3 dB if the ratio is equal to 1.

19. A wireless communication system including:
means for generating a wake-up packet addressed to another wireless communication system, the wake-up packet including a legacy preamble portion and a wake-up portion, wherein the legacy preamble portion is modulated according to a first modulation and includes information to allow a third-party station to refrain from transmitting during a length of the wake-up packet, and wherein the wake-up portion is modulated according to a second modulation lower than the first modulation and includes information to be decoded by a wake-up receiver of the other wireless communication system;
means for causing transmission of the legacy preamble using a first transmit power level; and
means for causing transmission of the wake-up portion using a second transmit power level higher than the first transmit power level by an amount, wherein the second modulation includes On-Off-Keying (OOK), the wake-up portion including a series of 1's corresponding to energy being transmitted on the wireless medium, and 0's corresponding to no energy transmitted on the wireless medium, and wherein the amount is based on a ratio of the number of 1's to the number of 0's of the wake-up packet.

20. The wireless communication system of claim 19, wherein:
a frequency spacing between tones in the wake-up portion is 78.125 kHz or 312.5 kHz;
the wake-up portion includes 26 tones or 13 tones per symbol; and
the wake-up portion has a symbol duration of 4 μsec.

* * * * *